United States Patent

[11] 3,608,715

[72] Inventors Herbert C. Snyder
 Brockway;
 Lewis W. McFadden, Brockway; Clyde W. Dickey, State College; Louis V. Mancuso, Reynoldsville, all of Pa.
[21] Appl. No. 9,236
[22] Filed Feb. 6, 1970
[45] Patented Sept. 28, 1971
[73] Assignee Brockway Glass Company, Inc.
 Brockway, Pa.

[54] METHOD AND APPARATUS FOR INSPECTING LIQUIDS
16 Claims, 10 Drawing Figs.

[52] U.S. Cl. .................................... 209/111.9,
 73/52, 73/61, 73/67
[51] Int. Cl. .................................... G01n 29/02,
 B07c 5/34
[50] Field of Search ........................ 73/61, 53,
 52, 67.5, 67.6, 67.7, 67, 69; 209/111.9

[56] References Cited
UNITED STATES PATENTS

| | | | | |
|---|---|---|---|---|
| 2,966,057 | 12/1960 | Heller | | 73/53 X |
| 3,093,998 | 6/1963 | Albertson et al. | | 73/61 |
| 3,264,863 | 8/1966 | Maropis | | 73/67 |
| 3,269,172 | 8/1966 | McGaughey | | 73/61 |
| 3,290,922 | 12/1966 | Thompson | | 73/52 |

FOREIGN PATENTS

| | | | |
|---|---|---|---|
| 470,239 | 8/1937 | Great Britain | 73/52 |
| 1,003,367 | 9/1965 | Great Britain | 73/69 |
| 1,037,533 | 7/1966 | Great Britain | 73/52 |

Primary Examiner—Louis R. Prince
Assistant Examiner—Joseph W. Roskos
Attorney—Christel & Bean ABSTRACT: A method and apparatus for detecting particulate matter in liquids in closed containers wherein ultrasonic energy is introduced to the liquid while in the container, for a predetermined time interval at a frequency and intensity sufficient to produce cavitation in a contaminated liquid but not in an uncontaminated liquid. The occurrence of cavitation is determined by the detection of high frequency noise. Ultrasonic energy at a frequency of about 65–90 kilocycles and duration of about 10 milliseconds is provided by a driving transducer including piezoelectric elements which are excited by a broad frequency band generator under control of a pulse generator. Cavitation noise, in the megacycle range and indicative of contamination, is detected by a pickup transducer comprising a drum-face-shaped element of sound transmitting material having a piezoelectric element attached to one side thereof. An output electrical signal is amplified and then can provide a visual or audible indication as well as activate a reject mechanism. In a preferred arrangement, the container bottom is supported on the pickup transducer which is apertured to allow passage therethrough of an end of the driving transducer, both transducers being supported in an hydraulic liquid in a self-leveling arrangement whereby regardless of the curvature of the container bottom, intimate contact is achieved between the container bottom and both transducers.

PATENTED SEP28 1971 3,608,715

Inventors:
Herbert C. Snyder
Lewis W. McFadden
Clyde W. Dickey
Louis V. Mancuso

BY

*Christel + Bean*
ATTORNEYS

PATENTED SEP 28 1971

Inventors:
Herbert C. Snyder
Lewis W. McFadden
Clyde W. Dickey
Louis V. Mancuso

BY

*Christel + Bean*
ATTORNEYS

Inventors:
Herbert C. Snyder
Lewis W. McFadden
Clyde W. Dickey
Louis V. Mancuso
BY Christel & Bean
ATTORNEYS Inventors:
Herbert C. Snyder
Lewis W. McFadden
Clyde W. Dickey
Louis V. Mancuso
BY Christel + Bean
ATTORNEYS Inventors:
Herbert C. Snyder
Lewis W. McFadden
Clyde W. Dickey
Louis V. Mancuso
BY
Christel + Bean
ATTORNEYS

3,608,715

METHOD AND APPARATUS FOR INSPECTING LIQUIDS

BACKGROUND OF THE INVENTION

The present invention relate s to the testing of liquids for the presence of solid impurities and, more particularly to a novel method and apparatus for inspecting liquids in closed containers for particulate impurities.

One area of use of the present invention is in the testing of drugs for the presence of particulate matter while the liquid drug is in a closed container. It has long been known that the presence of particulate matter in any drug intended for administration by injection might contribute to the formulation of granulomas in the smaller capillaries of the vascular system. Granulomas give rise to inflamed tissue in the region of the body affected, marked by the formation of granulations. In order to alleviate this problem, drug manufacturers handle, fill and seal all drug compounds in clean room areas to reduce the possibility of contamination. In addition, drug solutions are filtered through membranes, samples are constantly checked by both microscopic examination and electronic counting procedures, and all filled containers are given total visual inspection for the presence of any visible particles.

Although routine inspection of drug samples by filtration and by microscopic and electronic procedures is practical for statistical quality control, it becomes impractical in any total or one hundred per cent inspection system. Visual inspection of drug samples on a 100 percent basis not only is time consuming and costly, but also is ineffective in detecting the presence of particles below about 50 microns in size which despite their extremely small size still may contribute to capillary stoppage.

It therefore would be highly desirable to provide a method and apparatus for automatically inspecting the liquid contents of closed containers on a 100-percent or total basis which is sensitive to both visible and subvisible particles so that any container of liquid contaminated with particulate matter can be automatically rejected.

SUMMARY OF THE INVENTION

The present invention utilizes the principle of cavitation wherein high-frequency sound waves give rise to the formation of partial vacuums in a liquid the cavitation threshold of a liquid being a stable, fixed energy level dependent, among other things on the presence of contaminants as they alter the mechanical properties of the liquid. The present invention provides a method and apparatus for detecting particulate matter in liquids in closed containers wherein ultrasonic energy is introduced to the liquid while in the container for a predetermined time interval at a frequency and intensity sufficient to produce cavitation in a contaminated liquid but not in an uncontaminated liquid. The occurrence of cavitation is determined by the detection of high-frequency noise.

The present invention will be described with particular reference to the testing of drugs for the presence of particulate matter, although the principles of the invention can be variously applied to the testing of other liquids while in closed containers. While a single specific embodiment of the principles of the present invention is illustrated in the accompanying drawing and described in detail in the following specification it is to be understood that such embodiment is by way of example only and that various mechanical modifications may be made without departing from the spirit and scope of the invention.

DETAILED DESCRIPTION OF THE ILLUSTRATED EMBODIMENT

Figure 1:
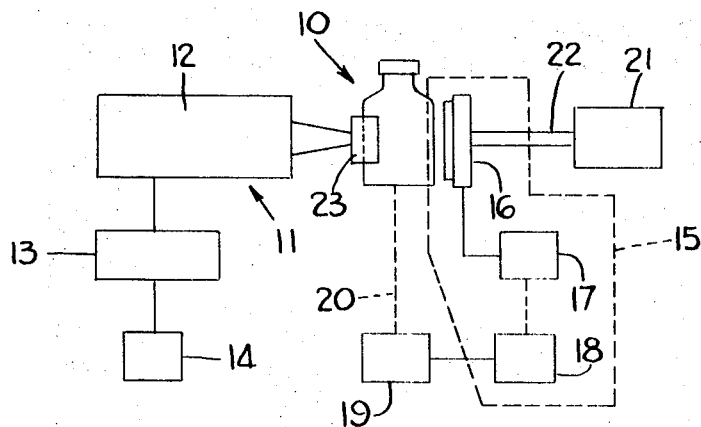
FIG. 1 is a schematic diagram of apparatus for inspecting liquids in closed containers constructed according to one embodiment of the present invention.

The present invention utilizes the principle of cavitation which relates to the formation of partial vacuums in a liquid by a body moving swiftly in the liquid or by high-frequency sound waves introduced to the liquid. The cavitation threshold of a liquid is a stable fixed energy level dependent upon the mechanical properties of the liquid and the presence of contaminants as they alter the "pure" mechanical properties. The mechanical properties that effect variation in cavitation threshold are: surface tension, tensile strength, vapor pressure, and the manner in which impurities alter the structural strength of the fluid. Particulate matter in the liquid, where solid-liquid boundaries are introduced, causes an increase in the number of stress concentration regions at the boundaries of the particles. At these points ultrasonic stress concentrations occur and the tensile strength of the liquid is exceeded. Gas molecules may also be present in the liquid at the surfaces of the impurities and this also provide nuclei for cavitation formation.

When the principle of cavitation is employed in a testing system, it is necessary to determine the degree to which the cavitation threshold is lowered by the presence of impurities. When the cavitation is to be produced by ultrasonic energy, there should be provision for the fact that ultrasonic energy introduced to a liquid at slightly above the cavitation threshold requires several milliseconds for the onset of cavitation to occur. The initial interval before cavitation onset is that period of time during which resonant nuclei must under go several expansions and contractions before the tensile strength of the liquid is exceeded. Rapid cavitation is assured after this initial interval due to the formation of new nuclei as a result of the tremendous peak pressures associated with cavitating liquids. The pressure peaks last for only fractions of microseconds, however, with the result that cavitation noise or sound is equivalent to very high frequency energy, that is, in the megacycle range.

In a liquid inspection system employing cavitation produced by ultrasonic energy introduced to the liquid, there should be a determination of the power level and frequency as well as the time for onset of cavitation so that a liquid having particulate contamination can be selected out before cavitation would occur in an uncontaminated liquid. This is necessary not only from the standpoint of inspection speed but also to prevent biological changes when the liquid tested is a drug. Stresses in biological structures due to vibrations are more apt to be destructive at high frequencies because the gradients are steeper due to the shorter wavelength. Since tearing and fragmentation of cells is also dependent on intensity and duration of impressed vibration, the frequency thereof should be as low as possible because the energy necessary to produce the onset of cavitation is directly related to the frequency of the source providing vibrations.

The method of the present invention for inspecting liquids of particulate contamination is begun by taking a container having the liquid therein and holding the container in a fixed position in contact with driving and pickup transducers. Ultrasonic energy produced by the driving transducer then is introduced through the container to the liquid for a predetermined time interval and at a frequency and intensity sufficient to produce cavitation in a contaminated liquid but in an uncontaminated liquid. Satisfactory results have been obtained with ultrasonic energy at a frequency from about 65 to about 90 kilocycles and introduced for a time interval of about 10 to about 30 milliseconds. Preferably the ultrasonic energy is introduced to the liquid in a direction along the longitudinal axis of the container.

The occurrence of high-frequency sound or noise indicative of the presence of particulate contamination in the liquid is detected by the pickup transducer. The cavitation noise or sound is equivalent to very high frequencies, in the megacycle rang. A signal produced by the pickup transducer, indicating that the container under inspection has a contaminated liquid is amplified and detected. The detected signal, in turn, is amplified and utilized to control suitable motive power means operatively connected to a reject mechanism for the purpose of separating containers found to have contaminated liquid from those containers found not to have contaminated liquid.

The foregoing method is carried out in preferred form by apparatus shown schematically in FIG. 1, and according to one embodiment of the present invention. A sealed container, designated 10 in FIG. 1, includes liquid such as a drug to be inspected for particulate contamination. The apparatus of the present invention is intended for use in a total or 100 percent inspection system, and container 10 therefore is one representative of a large series of liquid-filled containers which are transported sequentially, as on a conveyor, to and from the apparatus. Advantageously, the inspection is automatic and performed while the liquid is in a closed container.

Referring now to FIG. 1, the apparatus according to one embodiment of the present invention includes generating means, designated generally at 11, for providing ultrasonic energy at the output thereof for a predetermined time interval and at a given frequency and intensity. More specifically generating means 11 comprises a driving transducer 12 which consists of a plurality of piezoelectric elements, a broad frequency band generator 13 having the output thereof connected to transducer 12, and a pulse generator 14 connected in controlling relation to the input of generator 12. The construction and operation of these components of generating means 11 will be described in more detail hereafter.

The apparatus of the present invention further comprises detecting means, designated generally at 15 in FIG. 1, responsive to high-frequency noise or sound from the liquid for indicating the presence of particulate contamination therein. Detecting means 15 specifically includes a pickup transducer 16 having a piezoelectric element therein, an amplifier 17 having a plurality of stages and connected to transducer 16, and a detector or indicator circuit 18 connected to amplifier 17. The output of circuit 18 can be utilized to control suitable motive power means operatively connected to a reject mechanism for the purpose of separating containers found to have contaminated liquid from those containers found not to have contaminated liquid. The electrical and mechanical means for performing this stated function, which will be described in more detail hereafter, are designated generally by block 19 in FIG. 1 together with dotted line 20 representing the required mechanical operation on container 10 when a rejection is to be made.

The apparatus of the present invention finally includes supporting means for placing container 10 in contact with or in sufficiently close proximity to generating means 11 and detecting means 15 whereby ultrasonic energy is introduced to the liquid and high-frequency noise from the liquid is received by detecting means 15. In this embodiment the supporting means includes an air cylinder 21 operatively connected to pickup transducer 16 by means of rod 22 whereby transducer 16 is movable toward and away from a position close to or in contact with container 10. The uniform clamping pressure required in order to obtain constant power input and readout is obtained by having cylinder 21 of a known diameter and operated with closely regulated air pressure. The supporting means further includes a member 23 on the end of the driving transducer which member is constructed to act as a clamp as well as to transmit sound vibrations into container 10. This arrangement together with a surface on which container 10 would rest, for example the top surface of a conveyor, provides suitable positioning and support for each container undergoing inspection. It will be noted that in this particular embodiment, output sound from driving transducer 12 is introduced in a direction generally perpendicular with respect to the axis of container 10.

Figure 2:
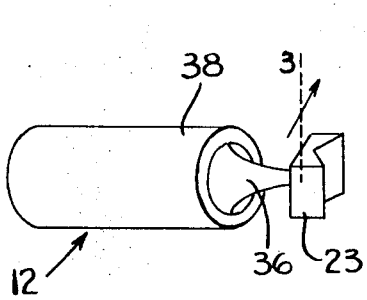
FIG. 2 is a perspective view of a preferred form of driving transducer included in the apparatus of FIG. 1.
Figure 3:
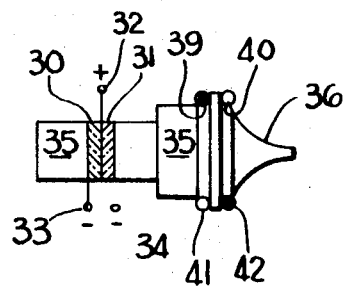
FIG. 3 is a longitudinal sectional view thereof taken about on line 3-3 in FIG. 2.

FIGS. 2 and 3 show in more detail a preferred form of driving transducer 12 constructed in accordance with the present invention. Transducer 12 comprises first and second piezoelectric elements 30 and 31, respectively which are generally disc-shaped and mounted back to back as shown in FIG. 1. Electrical leads designated 32–32 are attached to opposite faces of piezoelectric elements 30, 31, and the same polarity voltage preferably is applied to the abutting faces and to outer faces of elements 30, 31. In this particular illustration a positive polarity voltage is on lead 32 and a negative polarity voltage on leads 33, 34.

Piezoelectric elements 30, 31 are readily available commercially and widely used and understood so that a detailed description thereof is deemed unnecessary. Suffice it to say, elements 30 and 31 each can comprise a quartz crystal, and an alternating voltage applied across a quartz crystal will cause the crystal to vibrate. If the frequency of the applied alternating voltage approximates a frequency at which mechanical resonance can exist in the crystal, the vibrations will be intense.

Piezoelectric elements 30, 31, in turn, are cemented or otherwise mounted to a vibration transmitter member 35 of suitable material, for example aluminum. In particular, the outer opposite end faces of elements 30 and 31 are in contact with the body of member 35. Member 35 terminates in a generally horn-shaped tip 36 which because of the relatively small diameter end thereof provides an efficient transmission of vibrations from a point of relative concentration. The end of horn tip 36 is attached to one end of member 23, the opposite end of which is provided with a V-shaped notch whereby member 23, as previously described, serves to transmit vibrations into container 10 as well as to act as a clamp.

Member 35 together with piezoelectric elements 30, 31 are housed in a generally cylindrical shell 38 and supported therein by an arrangement which provides vibration isolation therefrom. Referring now to FIG. 3, member 35 is provided with first and second axially spaced annular grooves 39 and 40 in the body thereof. First and second O-rings 41 and 42, respectively of material such as rubber are positioned or seated in corresponding ones of the annular grooves 39 or 40, respectively. O-rings 41 and 42, in turn, contact the inner surface of shell 38 when member 35 is positioned therein, and due to the resilient nature of rings 41 and 42, member 35 and piezoelectric elements 30, 31 are given resilient isolation from shell 38. As a result, little if any vibration is transmitted to shell 38 wherein it would otherwise be wasted.

The transducer preferably is one wavelength in length formed by two half-wavelength resonators. One includes crystals 30, 31 sandwiched between two quarter-wavelength sections. The other resonator is the larger diameter section including tip 36, and the O-ring supports are located at the nodal region of this resonator and thus in a region of low energy.

Figure 4:
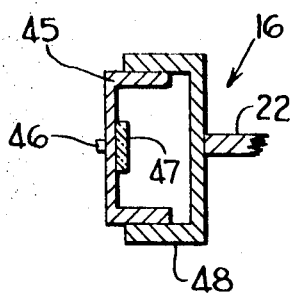
FIG. 4 is a sectional view of a preferred form of pickup transducer included in the apparatus of FIG. 1.

FIG. 4 shows in detail a preferred form of pickup transducer 16 constructed in accordance with the present invention. Transducer 16 comprises a shell 45 having a generally drum face configuration and of suitable vibration transmitting material, for example aluminum. The relatively thin and face of shell 45 is provided with a small protuberance or tip 46 on the outside thereof. During operation of the apparatus, the outer face of tip 46 is brought into contact with container 10, and the small area of the contact face of tip 46 serves to provide a point of relative concentration from which vibrations are received by transducer 16. A piezoelectric element 47 which is generally disc-shaped is cemented or otherwise mounted inside or on the back of the end face of shell 45. Element 47 is similar to piezoelectric elements 30, 31 included in driving transducer 12, and a suitable arrangement of electrical leads (not shown) would be provided for connecting piezoelectric element 47 to amplifier 17 shown in FIG. 1. Shell 45 is mounted in a supporting member 48 in a manner leaving tip 46 exposed and permitting connection to rod 22. In preferred form, supporting member 48 has the general shape of a drum face, the open end of which is fitted over a major portion of the axial length of shell 45 and the end face of shell 48 being connected to rod 22.

Figure 5:
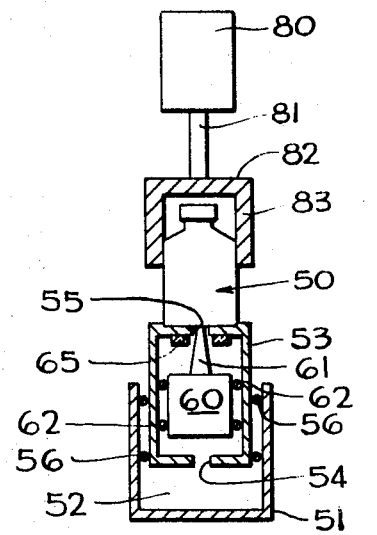
FIG. 5 is an elevational view, partly in section, of a liquid inspection apparatus according to a second embodiment of the present invention and showing some components thereof in schematic form.
Figure 6:
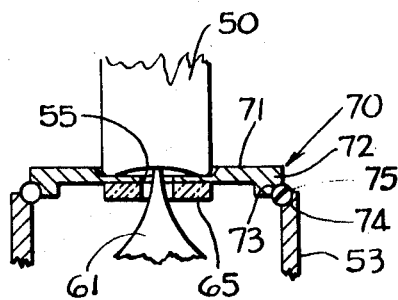
FIG. 6 is an enlarged, fragmentary sectional view showing a preferred form of a portion of the apparatus of FIG. 5.

Pickup transducer 16 of the present invention responds to high-frequency noise occurring within the liquid being tested and traveling through container 10. In this connection, the aluminum drum face configuration with a piezoelectric element cemented to the back thereof was found to work especially well. The noise will be in the megacycle frequency range, and with an arbitrary frequency of 1 megacycle, it was found desirable to have tip 46 and the end face of shell 45 each of a thickness of one-fourth wavelength. In other words, the total distance from piezoelectric element 47 to the contact face of tip 46 preferably is one-half wavelength based on the arbitrary frequency of 1 megacycle. FIGS. 5 and 6 show an arrangement of apparatus constructed in accordance with a second embodiment of the present invention. A sealed container 50 filled with liquid is shown positioned for inspection, and container 50 likewise is one representative of a large series of liquid-filled containers which are transported sequentially, as by a conveyor, to and from the apparatus. As in the example of the first embodiment, the inspection performed by the apparatus shown in FIGS. 5 and 6 advantageously is automatic and done while the liquid in in a closed container.

Referring now to FIG. 5, the apparatus includes a first supporting member in the form of a hollow cylindrical container 51 closed at one end and open at the other. Container 51 would be placed on a horizontal supporting surface in the position shown in FIG. 5 whereby hydraulic liquid 52 can be contained therein. The apparatus further includes a second supporting member 53, in preferred form a sleeve having a wall at each axial end thereof and first and second relatively small diameter apertures 54 and 55, respectively, in corresponding end walls of sleeve 53. The outer diameter of sleeve 53 is less than the inner diameter of container 51 whereby sleeve 53 is axially movable within container 51. In addition, the difference in respective diameters is sufficient to accommodate a pair of O-rings, each designated 56 in FIG. 5, positioned between sleeve 53 and container 51 and axially spaced relative to each other. O-rings 56 function to allow movement of supporting member 53 within member 51 while maintaining the axes of the two members generally coincident and to prevent leakage of hydraulic fluid upwardly between container 51 and sleeve 53 as will be apparent hereafter.

A driving transducer 60 which has a body terminating in a generally horn-shaped tip 61 is supported in sleeve 53 in an axially movable manner whereby tip 61 is movable through aperture 55 in the upper end wall of sleeve 53. Transducer 60 can be of a construction identical to that of transducer 12 of the embodiment of FIG. 1, and driving transducer 60 would be connected to a broad frequency band generator connected, in turn, to a pulse generator (both not shown) identical to generators 13 and 14 shown in FIG. 1. The outer diameter of transducer 60 is less than the inner diameter of sleeve 53 by an amount sufficient to accommodate a pair of O-rings, each designated 62 in FIG. 5, therebetween and axially spaced relative to each other. O-rings 62 serve to maintain the axes of transducer 60 and supporting member or sleeve 53 coincident so than tip 61 is freely movable through sleeve aperture 55. In addition, O-rings 62 prevent upward leakage of hydraulic fluid between transducer 60 and sleeve 53 for a reason which will be apparent hereafter.

As shown in FIG. 5 container 50 is placed with the bottom thereof supported on the surface or end wall of sleeve 53 which extends outwardly from container 51. Container 50 is positioned preferably in the center of the end wall but in any event so that aperture 55 through which horn tip 61 is movable is covered by the container bottom. This surface or end wall of sleeve 53 in contact with container 50 can be of vibration transmitting material to serve as a pickup transducer, and for that purpose a piezoelectric element 65, which in this embodiment is annular, is cemented or otherwise mounted to the inner surface of the sleeve end wall and at a location thereon whereby piezoelectric element 65 surrounds aperture 55.

FIG. 6 shows in detail a preferred construction of the pickup transducer included in the apparatus according to this embodiment of the present invention. The end wall of sleeve 53 is defined by a separate member 70 of good vibration transmitting material, for example aluminum. Member 70, it will be observed, has a relatively thin end wall portion 71 and a thicker sidewall portion 72 which is of a very small axial length and provided with a circumferential groove 73 therein. Sleeve 53 is provided with a corresponding annular groove 74, and an O-ring 75 is positioned between member 70 and sleeve 53, being seated in both annular grooves 73 and 74, for supporting member 70 resiliently on sleeve 53 while isolating sleeve 53 from vibrations imparted to element 70. By virtue of the construction of member 70, it has the preferred shape which is of a drum face configuration. The thickness of wall portion 71 can be reduced around aperture 55 so as to define a seat or depression to facilitate centering of container 50 on element 70.

Piezoelectric element 65 is connected to an amplifier and detector or indicator circuit (both not shown) identical to those designated 16 and 17, respectively, in FIG. 1. Likewise a suitable electrical-mechanical arrangement can be employed for rejecting those containers found to have contaminated liquid. The apparatus finally includes an air cylinder 80 mounted above the assembly and operatively connected through a rod 81 to a clamping member 82, the latter being moved into and out of contact with container 50 by cylinder 80. The uniform clamping pressure required in order to obtain constant power input and readout is obtained by having cylinder 80 of a known diameter and operated with closely regulated air pressure.

The apparatus shown in FIGS. 5 and 6 introduces ultrasonic energy to container 50 in a direction parallel to the axis of container 50 and in a manner whereby regardless of the base configuration of container 50, intimate contact is achieved between the container bottom and the driving and pickup transducers. Driving transducer 60 is centrally located so that the horn-shaped tip 61 thereof can protrude through an opening in the pickup transducer. Sleeve 53 which is fitted around driving transducer 60 provides support for the pickup transducer as well as container 50 and, in turn, is mounted in container 51. Tip 61 of driving transducer 60 is movable through aperture 55 in sleeve 53 as well as through annular piezoelectric element 65 to accommodate various base configurations of container 50. The provision of aperture 54 in sleeve 53 whereby the cavities of both container 51 and sleeve 53 are filled with hydraulic fluid allows the apparatus to be self-leveling. For example if the bottom of container 50 is flat, as air cylinder 80 is operated to clamp container 50 and move it downwardly onto the assembly, the bottom of container 50 will first contact tip 61 of driving transducer 60 which tip normally extends through aperture 55 a short distance beyond the upper end wall of sleeve 53. As container 50 then moves further downwardly, hydraulic fluid displaced from the cavity of sleeve 53 through aperture 54 forces sleeve 53 upwardly until contact with the bottom of container 50 is achieved. If, on the other hand, the bottom of container 50 is concave, the upper end wall of sleeve 53 will be contacted first by the peripheral edge of the container bottom. As container 50 moves further downwardly, sleeve 53 is moved downwardly also and forces hydraulic fluid from the cavity of container 51 through aperture 54 into the cavity of sleeve 53 whereupon the fluid forces driving transducer 60 upwardly until the end of horn tip 61 contacts the bottom of container 50.

Figure 7:
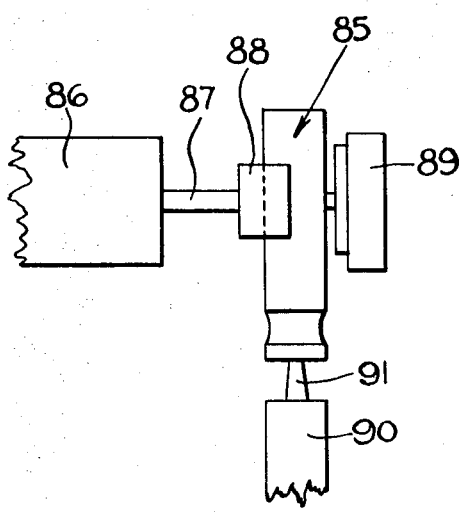
FIG. 7 is a schematic diagram illustrating an additional application of the apparatus of the present invention

FIG. 7 shows briefly a preferred arrangement for testing ampuls and syringe cartridges, one of which is designated 85. An air cylinder 86 is operatively connected through a rod 87 to suitable support jaws 88 for grasping container 85. The container 85 then is clamped between jaws 88 and pickup transducer 89, identical to pickup transducer 16 shown in FIG. 1, and a driving transducer 90 having a horn-shaped tip 91 is brought into contact with one end of container 85 to introduce ultrasonic energy in an axial direction. An arrangement similar to that of FIGS. 5 and 6 but reduced in size by an appropriate amount also may be employed for inspecting ampuls and syringe cartridges.

Figure 8:
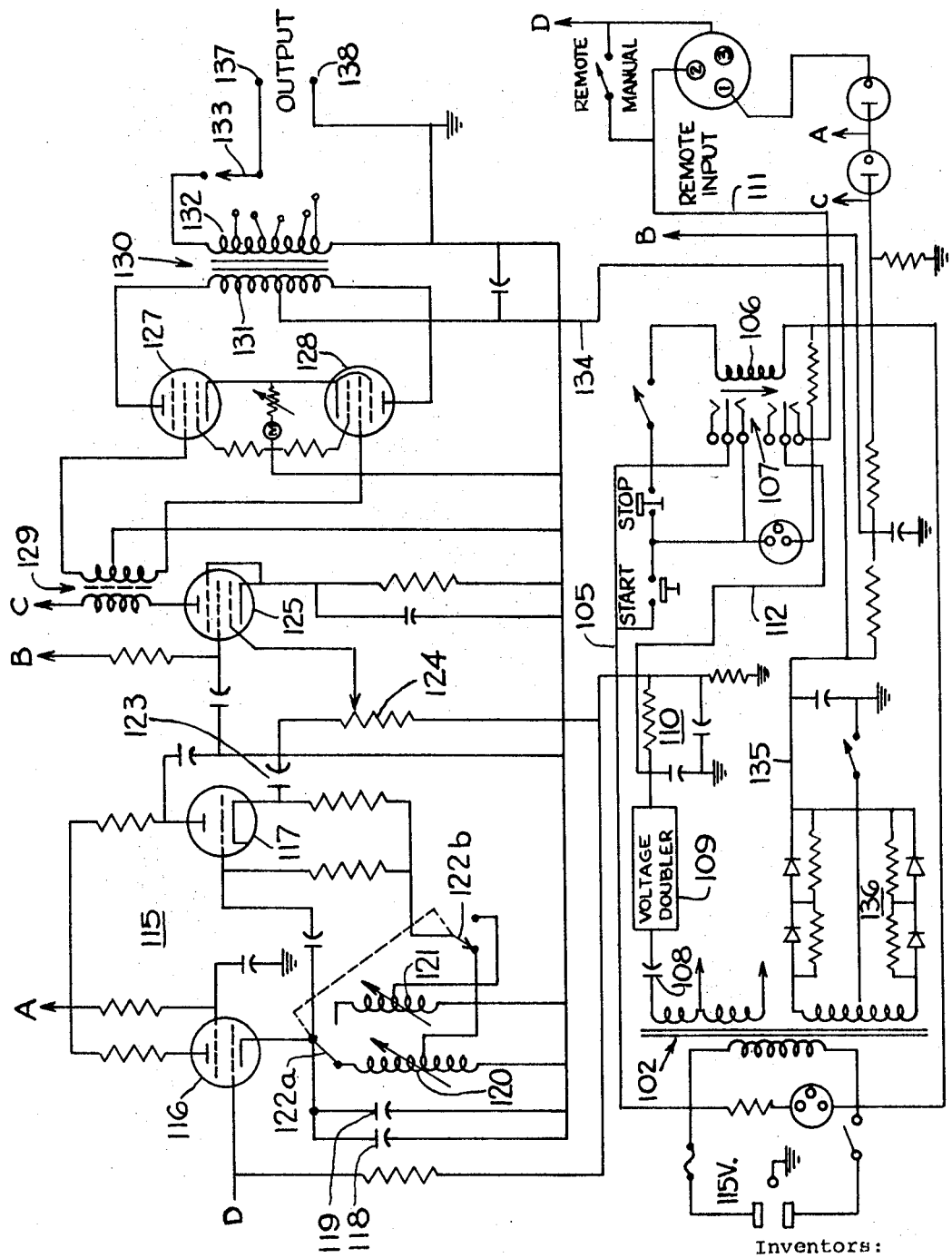
FIG. 8 shows a preferred circuit for the broad frequency band generator included in the apparatus of the present invention.

FIG. 8 shows a preferred circuit for the broad frequency band generator 13 included in the apparatus of the present invention. Generator 13 is constructed to have a capability of 100 watts total output over a frequency range from 25 to 300 kHz. In addition, a multiple scale capability, for example four scale, can be incorporated into the circuit. The duration of each of the output pulses provided generator 13 is controlled by the circuit designated 14 in FIG. 1, which will be described in detail hereafter, which circuit 14 is coupled to generator 13 through a connector designated 101 in FIG. 8. Generator 13 is powered by standard 115-volt alternating current which is applied to the primary winding of a transformer 102 and through a line 105 and manual "start" and "stop" switches to a relay coil 106 controlling a series of contacts 107. One secondary winding of transformer 102 is coupled through a capacitor 108 and voltage doubler circuit 109 to an R-C network 110. The lower set of contacts 107 in FIG. 8 when closed by coil 106 completes a circuit from connector 101 through lines 111 and 112 to the input of R-C network 109.

The output control pulse from generator 14 applied to connector 101 is superimposed on the output of voltage doubler circuit 109 in network 110 and the resulting signal is applied to the input of an oscillator circuit 115 including tetrode 116 and triode 117. A 6AU8 oscillator circuit was found to perform satisfactorily. The frequency band is determined by capacitors 118 and 119 and variable inductors 120 and 121 included in the cathode circuit of pentode 116 and under control of a switch 122. The output of oscillator 115 is coupled through a capacitor 123 connected between the cathode of triode 117 and one terminal of a gain control potentiometer 124, the other terminal of which is connected to a source of bias voltage. The wiper arm of potentiometer 124 is connected to the input or grid of a 6CL6 pentode amplifier 125. A push-pull amplifier comprising pentodes 127 and 128, both of which can be 6DQ6B type, is coupled through a transformed 129 to the plate circuit of amplifier 125. The plates of pentodes 127, 128 are connected to a transformer 130, in particular to corresponding ends of the primary winding 131 thereof. Secondary winding 132 is divided by a series of taps which, in turn, are selected by means of a switch 133. Primary winding 131 is connected also through lines 134 and 135 to the output of a rectifier circuit 136 connected to another secondary winding of transformer 102.

The output of generator circuit 13 appears across terminals 137 and 138 which, in turn, are connected to lead 32 and to leads 34 and 35, respectively, of piezoelectric elements 30 and 31 in a known manner. Switch 133 and the taps on transformer secondary winding 132 provide an impedance match whereby the transducer used can be operated on minimum load. It was found necessary to employ four driving transducers like transducer 16 in order to cover the output frequency range of generator 13. Any one transducer can only be operated at its resonant frequency plus several harmonics without severe power loss or damage to the ceramic driver itself. Therefore, several are needed in order to have a sufficient number of resonant peaks to cover the full frequency spectrum.

Figure 9:
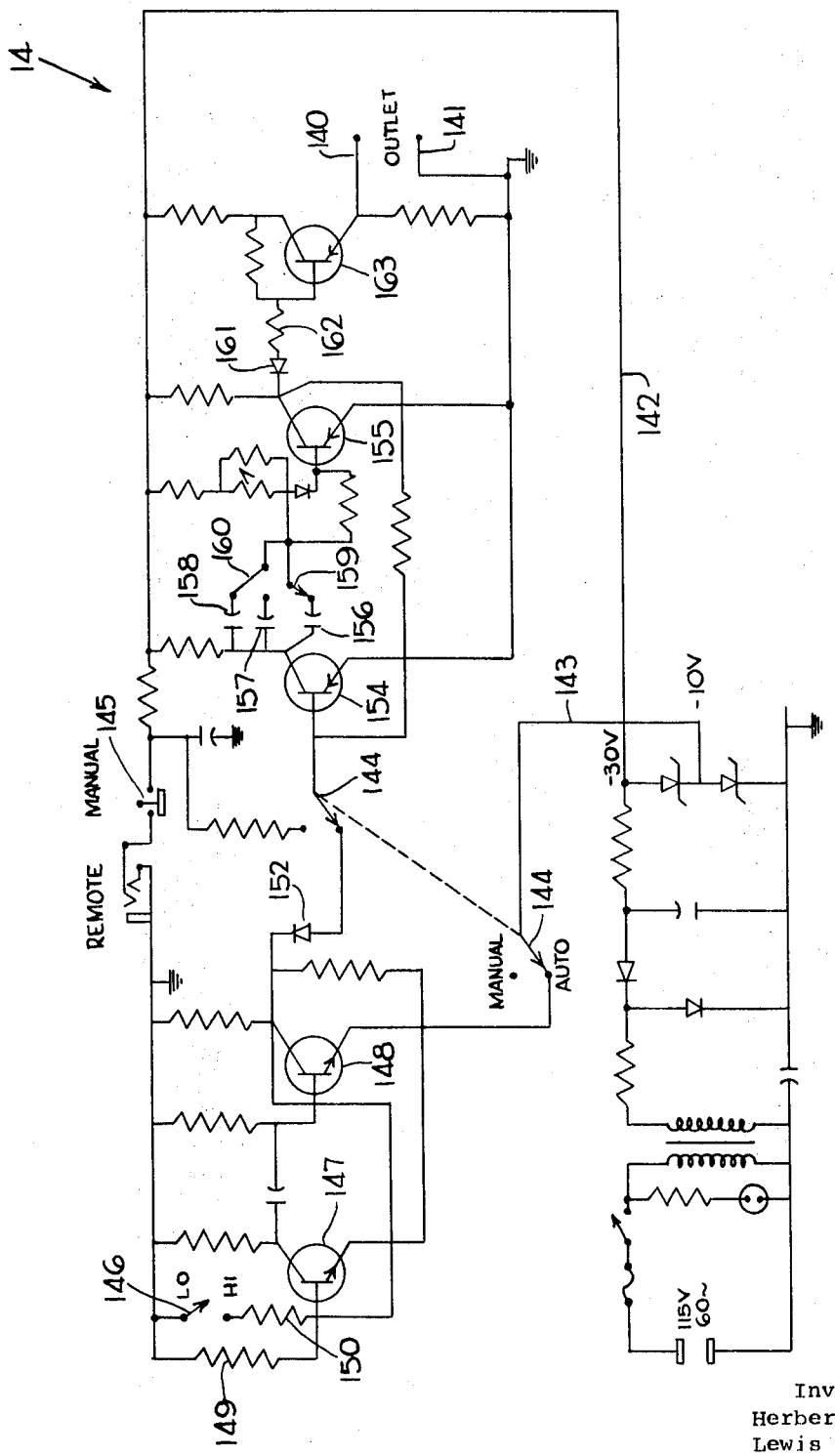
FIG. 9 is a circuit diagram of a pulse generator included in the apparatus of the present invention.

FIG. 9 shows a preferred circuit for pulse generator 14, the output of which is available across terminals 140, 141 which, in turn, are connected to frequency generator 13 at connector element 101 shown in FIG. 8. Pulse generator 14 is powered by standard 115-volt alternating current which is transformed, rectified and regulated to minus 30 volts DC available on line 142 and minus 10 volts on line 143. The circuit of FIG. 9 operates in one of two modes, manual or automatic, under control of a selector switch 144 and pushbutton 145. In the manual mode, button 145 must be depressed for generator 14 to provide one timed pulse of approximately −30 volts amplitude. The connection designated "Remote" enables this same manual operation to be initiated by a footswitch or other remotely located means. In the automatic mode, generator 14 provides continuous timed pulses at a rate determined by the position of a selector switch 146.

Pulse generator 14 includes a first stage comprising transistors 147 and 148 connected together as a free-running multivibrator. Transistors 147 and 148 preferably are NPN and of the 2NI306 variety. A 270 K resistor 149 and a 18 K resistor 150 are connected in the base circuit of transistor 147 whereby the output pulse rate of generator 14 is either 1 pulse per second or 5 pulses per second depending upon whether switch 146 is in the "low" or "high" positions, respectively. The output of the first stage multivibrator is connected through a diode 152 and switch 144 to the input of a one-shot multivibrator 153. Multivibrator 153 includes PNP transistors 154 and 155 both of which preferably are of the 2N2614 variety. The time of occurrence of an output pulse on terminals 140, 141 relative to an input signal to transistor 154 is varied by means of capacitors 156–158 and switches 159, 160. For example, with capacitors 156–158 having values of 0.33, 3.0 and 39 uf., respectively, the duration of the pulses ultimately provided by frequency generator 13 are 0.5, 5.0 and 50 milliseconds, respectively. The output of multivibrator 153 is connected through a diode 161 and resistor 162 to the base terminal of a transistor switch 163, the output of which is connected to circuit output terminal 140.

Thus, in the manual mode, switch 144 removes the free-running multivibrator comprising transistors 147, 148 from the circuit, and depression of bottom 145 activates one-shot multivibrator 153 to provide a single, timed output pulse. In the automatic mode, switch 144 connects transistors 147, 148 into the circuit, and the free-running multivibrator repetitiously activates multivibrator 153, at a rate determined by switch 146, whereby timed pulses appear continuously across terminals 140, 141.

Figure 10:
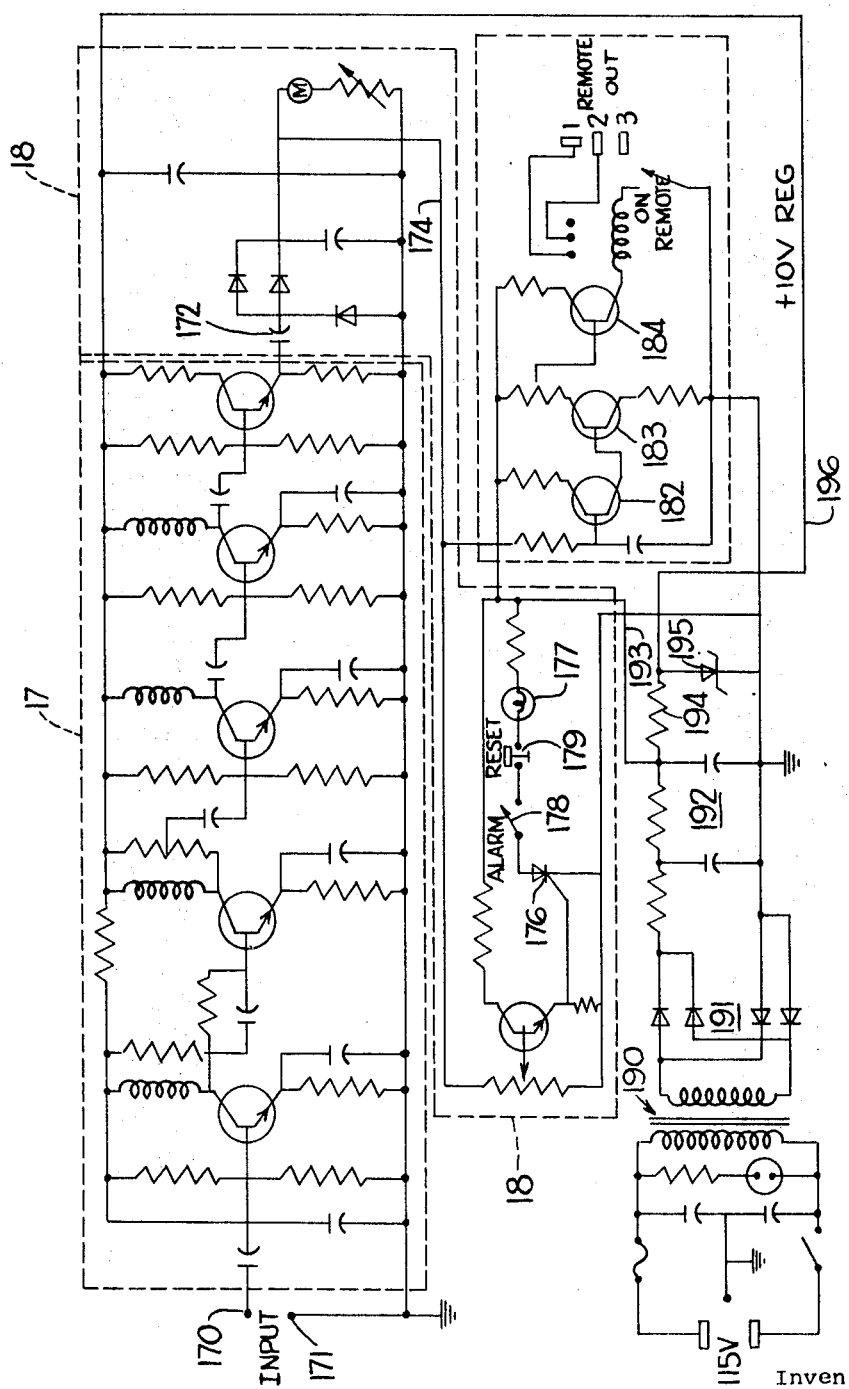
FIG. 10 shows a preferred detector or indicator circuit included in the apparatus of the present invention.

FIG. 10 shows a preferred form of amplifier 17, detector or indicator circuit 18, and circuit 19 included in the apparatus of the present invention. A signal provided by pickup transducer 16 is applied to amplifier 17 at input terminals 170, 171, wherein the signal is amplified approximately 60 decibels. Amplifier 17 preferably includes five NPN transistors each of the 2N706A variety. The output of amplifier 17 is coupled through a capacitor 172 to a diode detector circuit 173. The detected signal, available on line 174, is utilized in the present instance to perform two functions. One is a visual indication of the presence of a contaminated sample and to this end a portion of the detected signal on lead 174, the occurrence of which indicates the presence of such a sample, is applied to the base terminal of a transistor switch 175, the turning on of which applies a gating potential to the control terminal of a silicon controlled rectifier 176. The turning on of controlled rectifier 176 completes a circuit to an indicator lamp 177, assuming selector switch 178 is closed and reset button 179 is in the normally closed position shown in FIG. 10. Controlled rectifier 176 then can be turned off and lamp 177 deenergized by a simple depression of reset button 179 which beaks the circuit to the anode of the controlled rectifier. An audible rather than visual indicator, for example a buzzer, could of course be substituted for lamp 177.

The detected signal, available on line 174, is utilized to perform another function, namely rejection of a contaminated sample. To this end a portion of the detected signal on line 174, the occurrence of which indicates the presence of such a sample, is applied to the input of an amplifier circuit comprising two transistors 182, 183. The amplified signal is applied to the base terminal of a transistor switch 184 which, in turn, is connected in controlling relation to a relay coil 185. The presence of a contaminated sample thus will cause the relay (not shown) to latch up, and this, in turn, can complete an electrical circuit to a suitable motive power means for operating a mechanical reject mechanism.

The circuit of FIG. 10 is powered by standard 115-volt alternating current which is applied to the primary winding of a transformer 190, the secondary winding of which is connected to a full-wave rectifier 191. The output of rectifier 191 is smoothed by an R-C network 192, the output of which is connected by a lead 193 to the circuits which energize indicator lamp 177 and relay coil 185. The output of network 192 is applied through a resistor 194 to the anode of a Zener diode 195 whereby the voltage on lead 196 is regulated to +10 volts DC.

The operation of the apparatus of the present invention will be illustrated in further detail by way of a specific example. Samples were made up for test purposes which had known amounts of specific contaminants and, when possible, of a known size. The materials selected as contaminants were those reasonably expected to be present in a filled glass vial, i.e., glass and rubber from the container and its stopper and cellulose and asbestos fibers from filter media. In particular, the materials selected were: glass beads of a particle size 1–30 $\mu$.; latex of a particle size 6–14 $\mu$; cellulose having a particle size of a about 38 $\mu$; and asbestos in a colloidal microcrystalline silicate form, the particle size being undefined because of the fibrous shape.

Suspensions having a weight basis of 1 p.p.m. were prepared with each of these materials in conductivity water which had been filtered through 0.45 $\mu$. millipore membranes. These samples were packaged in 10 ml. blow-molded glass vials using flange-type stoppers which were lacquer coated. Reference standards were also prepared in the same manner using only 0.45 $\mu$. filtered water.

Tests were conducted using the prepared standards to determine at what frequency and power level it would be possible to obtain a reject signal form the contaminated samples without rejecting the 0.45 $\mu$. filtered water. The procedure employed was to clamp a test container, such as containers 10 or 50, in intimate contact with driving transducer 12 and with pickup transducer 16 or 70, depending upon the arrangement selected. Then driving transducer 12 is tuned under test to a resonant frequency or harmonic, the load impedance is matched by means of switch 133 and the taps on transformer secondary winding 132 shown in FIG. 8, the matching being as close as possible to reduce the driving power to a minimum, and an appropriate gain setting then is selected.

A pulse duration in the range of from about 10 to about 30 milliseconds was used in the tests as the inspection time, and it was found that a driving frequency in the range of 65 to 90 kilocycles provides the greatest sensitivity of cavitation threshold. Cavitation produced in a contaminated sample is manifested as high-frequency noise, in the megacycle range, which activates the pickup transducer to provide an output electrical signal. The signal, in turn, is utilized to indicate that the particular sample is contaminated so that it can be rejected.

The number of times each test vial was rejected was plotted as a percentage against the pulse time for a constant power setting and frequency. From this data the overall average in each case can be plotted and represents the mean value of the total number of measurements at each pulse time. From these plots and arbitrarily selecting 10 milliseconds as an ideal inspection time, it was seen that with the apparatus of the present invention one would expect to reject 91.0 percent of any vials containing glass fragments, 98.0 percent of those containing rubber particles, 83.0 percent having asbestos fibers, and 93.0 percent of vials containing cellulose particles. With this apparatus under the same conditions, only about 16 percent of the uncontaminated vials, i.e., those containing only the 0.45 $\mu$. filtered water, were rejected.

The arrangement of apparatus shown in FIGS. 5, 6 and 7 wherein ultrasonic energy is introduced to the container in a direction generally parallel with respect to the axis of the container, is preferred. One reason is that the noise indicative of cavitation in a contaminated liquid is believed to be significantly less dependent on the location of the particle in the container when ultrasonic energy is introduced axially as compared to when the energy is introduced perpendicular to the container axis in the manner shown in FIG. 1.

Thus it can be determined at what frequency and power level of excitation energy there will be contained a reject signal from a contaminated liquid but not from an uncontaminated liquid. It would be advantageous also if there were some reasonable assurance that any cavitation observed was from actual particulate matter suspended in the solution and not from undissolved gas bubbles serving as nuclei. In this connection, it is noted that the driving frequency determines the maximum size of a bubble nucleus which will grow to a size which results in a catastrophic collapse. For example, at a driving frequency of 20 kilocycles, the maximum bubble size that will have time to grow to the point of collapse is approximately 1 micron. With the method and apparatus of the resent invention the driving frequency preferably is in the range of 65 to 90 kilocycles, any bubbles in the liquid will have considerably less time to grow.

We claim:

1. A method of inspecting liquids for particulate contamination while in a container comprising the steps of:
    a. introducing ultrasonic energy to the liquid for a predetermined time interval and at a frequency and intensity sufficient to produce cavitation in a contaminated liquid but not in an uncontaminated liquid; and
    b. detecting the occurrence of high-frequency sound or noise indicative of the presence of particulate contamination in the liquid.

2. The method defined in claim 1 further comprising the step of separating containers found to have contaminated liquid from those containers not found to have contaminated liquid.

3. The method defined in claim 1 wherein ultrasonic energy is introduced to the liquid through the container.

4. The method defined in claim 3 wherein the step of introducing ultrasonic energy to the liquid is done in a direction along the longitudinal axis of the container.

5. The method defined in claim 1 wherein the step of introducing ultrasonic energy to the liquid is done for a time interval in the range from about 10 to about 30 milliseconds.

6. The method defined in claim 1 wherein the step of introducing ultrasonic energy to the liquid is done at a frequency from about 65 to about 90 kilocycles.

7. Apparatus for inspecting liquids for the presence of particulate contamination while in a container comprising:
    a. generating means for providing ultrasonic energy at the output thereof for a predetermined time interval and at a frequency and intensity sufficient to produce cavitation in a contaminated liquid but not in an uncontaminated liquid;
    b. detecting means responsive to high-frequency noise or sound from the liquid for indicating the presence of particulate contamination therein; and
    c. supporting means for placing a container in contact with or in sufficiently close proximity to said generating means and said detecting means whereby ultrasonic energy is introduced to said liquid and high-frequency noise from said liquid is received by said detecting means.

8. The apparatus defined in claim 7 further comprising means operatively connected to said detecting means for separating a container physically from other containers in response to an indication from said detecting means.

9. The apparatus defined in claim 7 wherein said generating means comprises:
   a. a broad frequency band generator having an output and having input terminals adapted for connection to a source of electrical power;
   b. piezoelectric transducer means connected to the output of said frequency generator;
   c. pulse-generating means having input terminal adapted for connection to a source of electrical power for providing an output pulse having a predetermined width; and
   d. means for connecting the output of said pulse generating means in controlling relation to said frequency generator.

10. The apparatus defined in claim 9 wherein said frequency generator provides a power output of about 100 watts over a frequency range of from about 25 to about 300 kilohertz and wherein a plurality of piezoelectric transducers is connected to the output of said generator.

11. The apparatus defined in claim 9 wherein said pulse generating means provides an output pulse having a width variable in a range of about 0.5 to about 50 milliseconds.

12. The apparatus defined in claim 7 wherein said detecting means comprises:
   a. a piezoelectric transducer at the input thereof;
   b. a plurality of amplifier stages having an input and an output;
   c. means for coupling said transducer to the input of said amplifier stages; and
   d. an indicator circuit coupled to the output of said amplifier stages.

13. The apparatus defined in claim 7 wherein said supporting means places a container in contact with said generating means in a manner whereby ultrasonic energy is introduced to the liquid in a direction parallel to the axis of the container.

14. The apparatus defined in claim 7 wherein said generating means and said detecting means include driving and pickup transducers, respectively, said transducers being supported by said supporting means in a relatively movable manner whereby said pickup transducer is adapted to support a container being inspected at the bottom thereof and said driving transducer is movable through said pickup transducer into contact with the container bottom.

15. The apparatus defined in claim 7 wherein said supporting means comprises:
   a. a first supporting member adapted to contain an hydraulic liquid;
   b. a second supporting member movable within said first supporting member and having a surface adapted to support a container being inspected, said surface having an aperture therein;
   c. means supporting said generating means movably within said second supporting member whereby a portion of said generating means is movable through the aperture in said supporting surface and into contact with a container being inspected; and
   d. said second supporting member having an aperture therein allowing fluid communication between the interior thereof and the interior of said first supporting member;
   e. whereby hydraulic fluid when contained in said first supporting member can act on said second supporting member and said generating means in a manner allowing said generating means to move into contact with the bottom of a container being inspected regardless of the degree of curvature thereof.

16. The apparatus defined in claim 15 wherein said surface of said second supporting member adapted to support a container is of vibration transmitting material and said detecting means is operatively connected to said surface.